United States Patent Office.

JOSEPH NAFTEL, OF CLEVELAND, OHIO.

Letters Patent No. 103,074, dated May 17, 1870.

IMPROVED COMPOUND FOR MANUFACTURE OF VARNISH AND PAINTS.

The Schedule referred to in these Letters Patent and making part of the same

*To all whom it may concern:*

Be it known that I, JOSEPH NAFTEL, of Cleveland, county of Cuyahoga, State of Ohio, have invented a new and Improved Compound for Varnish, and which may be used as a substitute for linseed-oil, or, in combination therewith, with pigments, making a varnish-paint, and which is compounded of the ingredients and in the proportion hereinafter mentioned.

It is well known that resin varnish is more or less tacky when used and dried, and, without it is combined with copal varnish, or some active dryer, it remains tacky, and, when exposed to heat, it becomes sticky, which is a very serious objection to its use.

The object of my improvement is to render the varnish or paint made to dry hard and glossy, without the tacky or sticky characteristic of this class of varnish or paint, when made in the ordinary way, and to accomplish this I treat the resin, and other like products with alkali, as hereinafter set forth, by which the tacky or sticky character of the resin varnish or paint is so neutralized that, in drying, it becomes hard and glossy, without the objectionable features before stated.

To make forty gallons of the said compound I take six gallons of liquid alkali, about 50° Baumé, made from soda-ash, or other form of alkali, having the same equivalent, into which I put one hundred and fifty pounds of resin, in a suitable vessel, over a slow fire; or the said ingredients, when in this state, may be subjected to the action of hot air or steam, instead of a slow fire, until the resin is thoroughly melted and combined with the alkali.

The excess of water is eliminated by the evaporation going on during the process.

While the compound is thus in its heated state, I add about twenty-three gallons of benzine or turpentine; the whole being intimately combined by stirring, is then allowed to cool, which will make a varnish about the consistency of ordinary copal varnish of commerce, and which may be thinned or reduced for use by the ordinary means.

In case I wish to produce a harder surface to the varnish prepared as before stated, I add to the above quantity five gallons of ordinary painter's liquid-shellac dryer, which is usually made of gum-shellac, litharge, red lead, manganese, linseed-oil, with turpentine or benzine.

In order to make a paint of this compound or varnish, I combine with it such pigments as may be desired, according to the color required, and then reduce by benzine or turpentine, as in the usual way of thinning paints for use.

I do not confine myself to resin only, as I design to use in place thereof, and in the same way, any of the resins or gums susceptible of being digested by alkali, and treated in the manner as herein set forth in relation to resin.

What I claim as my improvement, and desire to secure by Letters Patent, is—

The herein-described mode of treating resinous or balsamic gums, or products as are suitable for varnish or admixture with pigments, by means of a solution of alkali, in the manner set forth, and with benzine or turpentine, for the purpose described.

JOSEPH NAFTEL.

Witnesses:
W. H. BURRIDGE,
J. H. BURRIDGE.